(12) United States Patent
Konop

(10) Patent No.: US 6,371,499 B1
(45) Date of Patent: *Apr. 16, 2002

(54) LATCH ASSEMBLY ARRANGEMENT FOR TAG AXLE

(75) Inventor: Chad O. Konop, Appleton, WI (US)

(73) Assignee: McNeilus Truck and Manufacturing, Inc., Dodge Center, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/507,606

(22) Filed: Feb. 21, 2000

(51) Int. Cl.$^7$ ................................. B62D 61/12
(52) U.S. Cl. ................ 280/86.5; 280/42.23; 280/43.17; 180/24.01; 180/209
(58) Field of Search ............................ 280/86.5, 42.23, 280/43.17; 414/401; 180/24.01, 209

(56) References Cited

U.S. PATENT DOCUMENTS

| 4,061,361 A | 12/1977 | Felburn |
| 4,199,262 A | 4/1980 | Cribb et al. |
| 4,314,709 A | 2/1982 | Silbernagel |
| 4,501,437 A | 2/1985 | Becker |
| 5,018,755 A | 5/1991 | McNeilus et al. |
| 5,868,078 A | 2/1999 | Madison |
| 5,897,123 A | 4/1999 | Cherney et al. |

FOREIGN PATENT DOCUMENTS

| FR | 2593460 A1 | * 7/1987 | ............. B60P/1/02 |
| GB | 2154972 A | * 9/1985 | ............. B61G/5/00 |
| WO | WO9425689 | * 11/1994 | ............. E02F/3/36 |

* cited by examiner

Primary Examiner—Lanna Mai
Assistant Examiner—Paul Royal, Jr.
(74) Attorney, Agent, or Firm—Nikolai & Mersereau, P.A.

(57) ABSTRACT

An auxiliary axle system for a work vehicle is disclosed including a pair of spaced arms pivotally mounted to the vehicle, at least one tag axle and wheel and a cross member and a latch pin carried on one arm. An operating system for moving the auxiliary axle assembly between a raised stowed position and a ground engaging support position is provided with a modular latch mechanism for retaining the auxiliary axle assembly in the elevated position by containing the latch pin. The modular latch mechanism is carried on a base plate mounted as a unit through adjustable bolt slots behind an existing vehicle metal structure so that only a hook device extends beyond the plate.

6 Claims, 6 Drawing Sheets

LATCH ASSEMBLY ARRANGEMENT FOR TAG AXLE

BACKGROUND OF THE INVENTION

I. Field of the Invention

The present invention relates generally to auxiliary axle systems for load-hauling vehicles and, more particularly, to a stowable tag axle system that includes a safety latch which positively latches the axle in the stowed position when the axle is retracted or disabled for repairs. The invention provides an improved latching system for securing the tag axle which has a compact and unitary construction which readily installs on a truck body, is easily positionally adjusted and in which the mechanism is shielded from clogging debris and corrosive materials in the case of a transit mixer application.

II. Related Art

Optionally deployable auxiliary axle systems are well known and often associated with a variety of types of load-hauling vehicles, particularly those accustomed to time-varying loading, such as dump trucks, refuse collection vehicles and transit concrete mixers. Such vehicles typically include a chassis or frame, a cab and a dedicated truck body mounted on the chassis behind the cab. Such vehicles also include a forward steering axle placed near the front of the cab and one or more sets of drive axles spaced behind the steering axle, the drive axles often being provided in a dual axle arrangement. The auxiliary axle systems furnish additional load carrying capacity by adding an axle for assisting the steering and drive axles in supporting the load and in adjusting the inter-axle distance or increasing the overall front-to-rear axle span distance for the vehicle. In this manner, not only does the tag axle system assist in balancing the load carried by, for example, a transit mixing cement truck, but generally it also enables the truck to carry a higher legal total payload than would otherwise be permitted because weight restrictions placed on vehicles traveling over highways are typically measured in terms of load per axle in combination with overall spacing between the vehicle axles.

Examples of such auxiliary axle assemblies that can be selectively engaged with the ground are shown, for example, in U.S. Pat. Nos. 5,897,123 and 5,018,755. Thus, it is known to have tag axle systems generally consisting of a rear tubular cross member carrying spaced wheel assemblies and carried by a pair of spaced tag axle arms which, in turn, are pivotally mounted to the rear portion of a truck chassis according to a generally known arrangement. Linear reciprocating operating devices, typically hydraulic cylinders, or pneumatic devices are employed to pivot the tag axle system between a raised or stowed position and a lowered or ground-engaging position.

To assure that the tag axle assembly will remain in the elevated or stowed position until it is intentionally lowered to the ground-engaging position, it is known to add some type of external latching mechanism such as that which is shown in FIG. 1 which illustrates a fragmentary side elevational view of a transit mixer with a tag axle assembly in its raised or stowed position. The view includes a portion of a vehicle frame 12, dual axle drive wheels 14, a mixing drum 16 partially supported by a rear mixing drum mount support frame 18 and a tag axle assembly which includes a pair of arms 20 pivotally mounted at one of their ends to the frame to the vehicle. A tag axle 22 carrying a tag wheel 24 is mounted to the opposite end of each arm 20. A common torque tube is shown at 26 and a shaped cam plate at 28 which cooperates with a cam follower wheel 30. Retraction air actuators are shown at 32 with associated arms 34. A further cam link assembly is provided which includes a pair of cam link arms, one of which is shown at 40 mounted from a pivot 42 and a pair of deployment air springs, one of which is shown at 44 which is affixed to the support frame 18 of the mixing drum using suitable means and to the cam link arms 40.

When the retraction actuators 32 are inflated, the arms 34 pull on the pivot members 36 connected to the torque tube cross member 26 to cause the tag wheels 24 to elevate to a retracted or stowed position. Conversely, deflation of the air actuators 32 and inflation of the deployment air springs 44 produces a downward force on the cam link arm 40 which is transferred to the arm roller 30 and then through the cam plate 28 of the tag assembly thereby lowering the tag axle wheels 24.

As previously indicated, to retain the tag axle assembly in the elevated position, there is further provided an external latching mechanism which includes a hook 50 pivotally mounted at one end to the mixing drum mount 18 and situated so that it can engage a pin 52 attached to the arm 20 of the tag axle assembly at an appropriate location. The hook is further provided with a biasing spring 53 and a pneumatic hook actuator at 54. Inflation of the actuator 54 overcomes the biasing of the spring 53 thereby releasing the pin 52 from the grasp of the hook 50. Otherwise, the biasing spring provides sufficient force to retain the pin 52 in the hook 50.

While this and other similar external hook arrangements have been known to function adequately, they consist of a number of parts which must be separately positioned relative to each other and aligned with the tag axle pin and the parts are exposed to mixing drum contents, acid washes and other hazards associated with the mixing and dispensing and cleanup of transit-mixed concrete. Accordingly, the parts readily become clogged with debris inhibiting operation of the spring and the pivoting of the hook to the point where operation of the hook 50 is impaired, thereby impairing the positive latching of the stowed tag axle system. In addition, corrosion of the separately attached parts leads to frequent difficult removal and replacement.

Accordingly, there remains a need for a compact and efficient safety latch system for tag axles which is easily removed and replaced as a unit and which does not have its integral operating parts exposed to the materials and cleaning agents associated with transit concrete mixing or other materials.

Accordingly, it is a primary object of the present invention to provide a compact modular safety latch for tag axles which is easily removed and replaced as an independent unit.

It is a further object of the present invention to provide a safety latch for tag axles associated with load hauling vehicles such as transit concrete mixers which has its moving parts shielded from contact with mixed cement, mixing materials and wash materials.

Other objects and advantages associated with the present invention will become apparent to those skilled in the art upon further familiarization with the specification, drawings and claims contained in this application.

SUMMARY OF THE INVENTION

The present invention provides a compact modular safety latch assembly for retaining an associated pivoting tag axle assembly in a stowed position when not in use and when the system must be retained in an elevated position with the vehicle shut off as for the performance of maintenance on the vehicle. The system employs a cylinder-operated, spring-biased pivoting hook arrangement assembled as a modular unit on a base plate for attachment to and behind the rear mixing drum mount support metal structure of a transit mixer or the like so that only the catch portion of the hook member protrudes through a slot in the support plate of the drum support structure. The modular safety latch system may be mounted through slotted openings in the plate of the vehicle which cooperate with slotted openings in the base or support plate directed in the opposite direction so that both vertical and horizontal adjustment is provided in the system for easy mounting and final alignment adjustment of the relative location of the latch hook so that the retention pin attached to the tag axle swing frame can be captured as desired. In this manner, the moving parts of the system are all located behind the metal support plate and are less likely to encounter clogging and corrosive materials in use.

The detailed embodiment of the modular safety latch itself includes a base plate carrying a pair of shaped, paced parallel flange members fixed to it and which, in urn, carry the latch hook pivotally journaled on a pivot pin spanning and mounted in the flanges. The latch hook is a member of dedicated shape having a top or forward curved hook section above the pivot and a lower or rearward tail section below the pivot and a fluid cylinder is provided which is bolted to the flanges in a manner such that extension of the rod associated with the cylinder overcomes spring biasing (below) pushes on the tail of the latch hook and pivots the latch hook away from and releases the latch pin (as the system is mounted on the vehicle). A counter-biasing tension spring extends between the latch hook and a member attached to the rear of the latch-operating cylinder to pivot and hold the latch against the cylinder rod and in a fully lowered or latched position when the operating rod is retracted or collapsed into the cylinder.

In operation, the operating cylinder is a normally retracted or collapsed and assumes this position when the fluid (hydraulic or pneumatic) pressure is lost in the cylinder. In this position, the biasing spring pivots the latch fully downward, placing it in the pin-capture position so that a stowed tag axle system will remain engaged by the latch hook until positive pressure operates the cylinder to extend the rod and overcome the spring tension thereby pivoting and raising the latch hook to release the pin.

In this manner, a relatively fool-proof latch system is provided in which the mechanism is substantially protected from the clogging and corrosion associated with past systems. In addition, the invention provides a modular unit which is readily installed, adjusted and replaced as necessary during the life of the vehicle.

BRIEF DESCRIPTION OF THE DRAWINGS

In the drawings, wherein like numerals are utilized to designate like parts throughout the same.

DETAILED DESCRIPTION

In accordance with the detailed description of the present invention, the particular embodiment illustrated and described is meant to be illustrative of the invention rather than limiting in any manner and it is believed that other structures may occur to those skilled in the art which remain well within the confines of the inventive concept. Also, the modular latch system of the invention may be used with other types of load hauling or work vehicles using tag axles which operate in the same or a similar manner.

Figure 1:
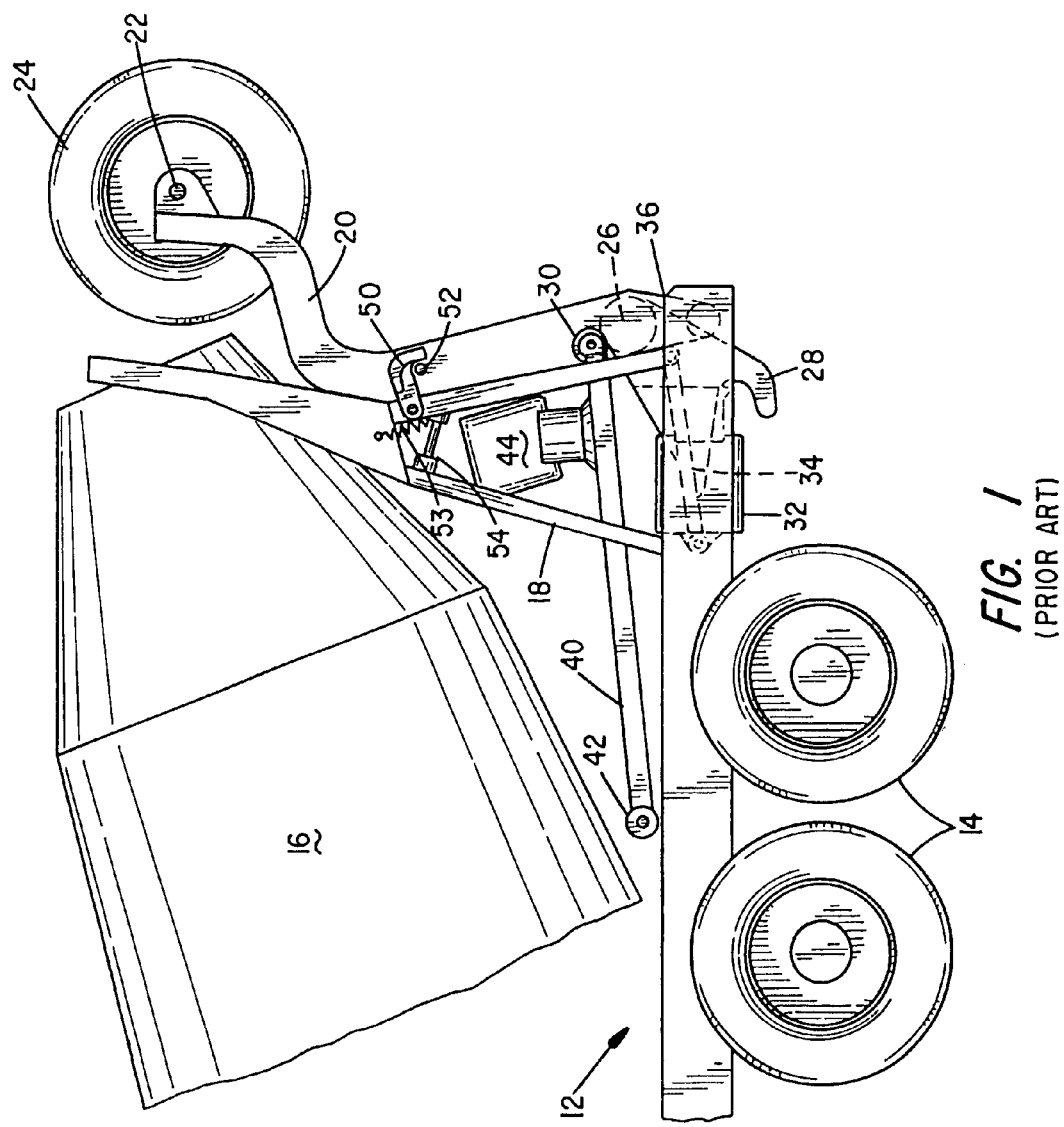
FIG. 1 is a fragmentary side view showing a tag axle assembly in the raised position and utilizing a latch in accordance with the prior art.
Figure 2:
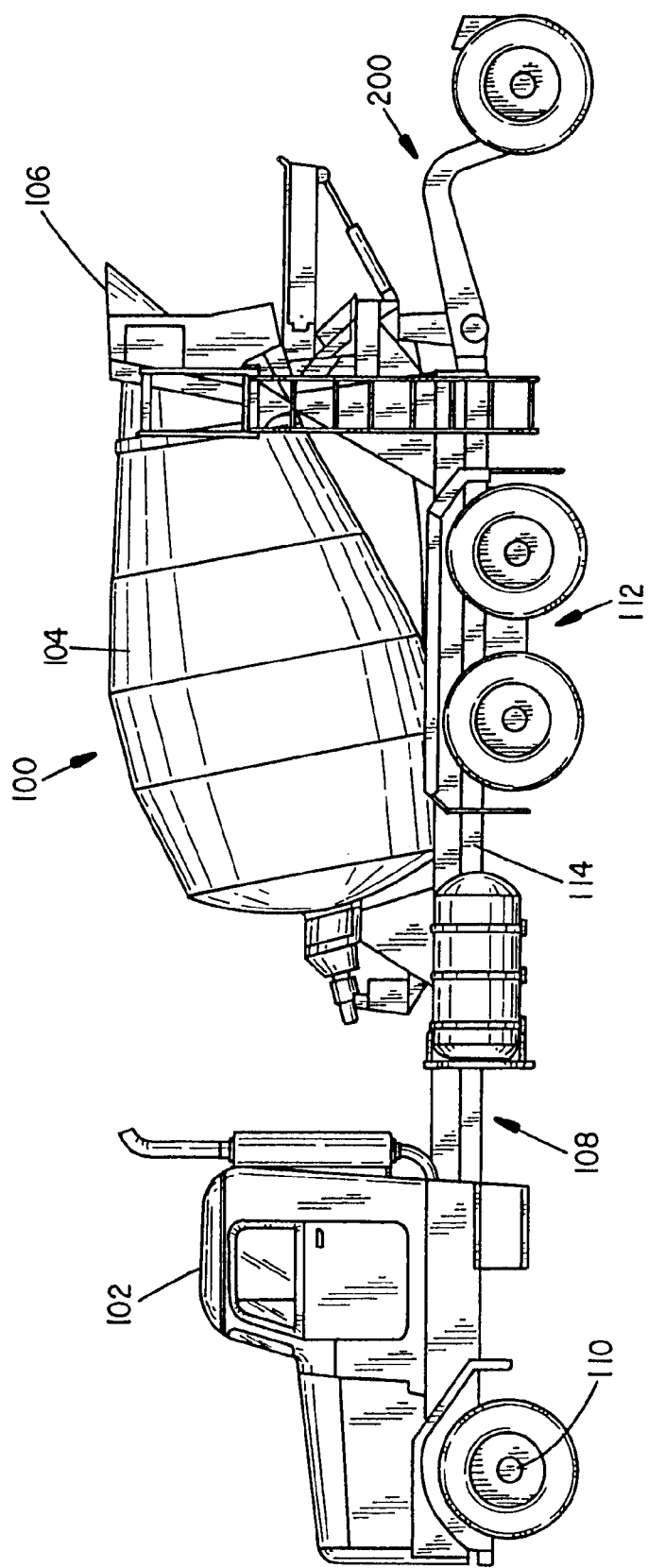
FIG. 2 is a side view of a transit concrete mixing work vehicle having an auxiliary axle of a class suitable for use with the latch of the present invention shown in the deployed position.

FIG. 2 shows a transit concrete mixing truck 100 having a cab 102 and a drum 104 mounted behind the cab for receiving materials through a hopper 106, internally mixing concrete and dispensing same through the rear of the drum 104. The vehicle includes a chassis 108 on which the drum and the cab are mounted and which is provided with a steering axle 110 and a dual axle drive wheel arrangement 112. The chassis further includes a pair of spaced parallel chassis members, one of which is shown at 114, which extend along the length of work vehicle 100 and from which an auxiliary axle, generally 200, is pivotally mounted, as shown in more detail in FIGS. 3 and 4.

Figure 3:
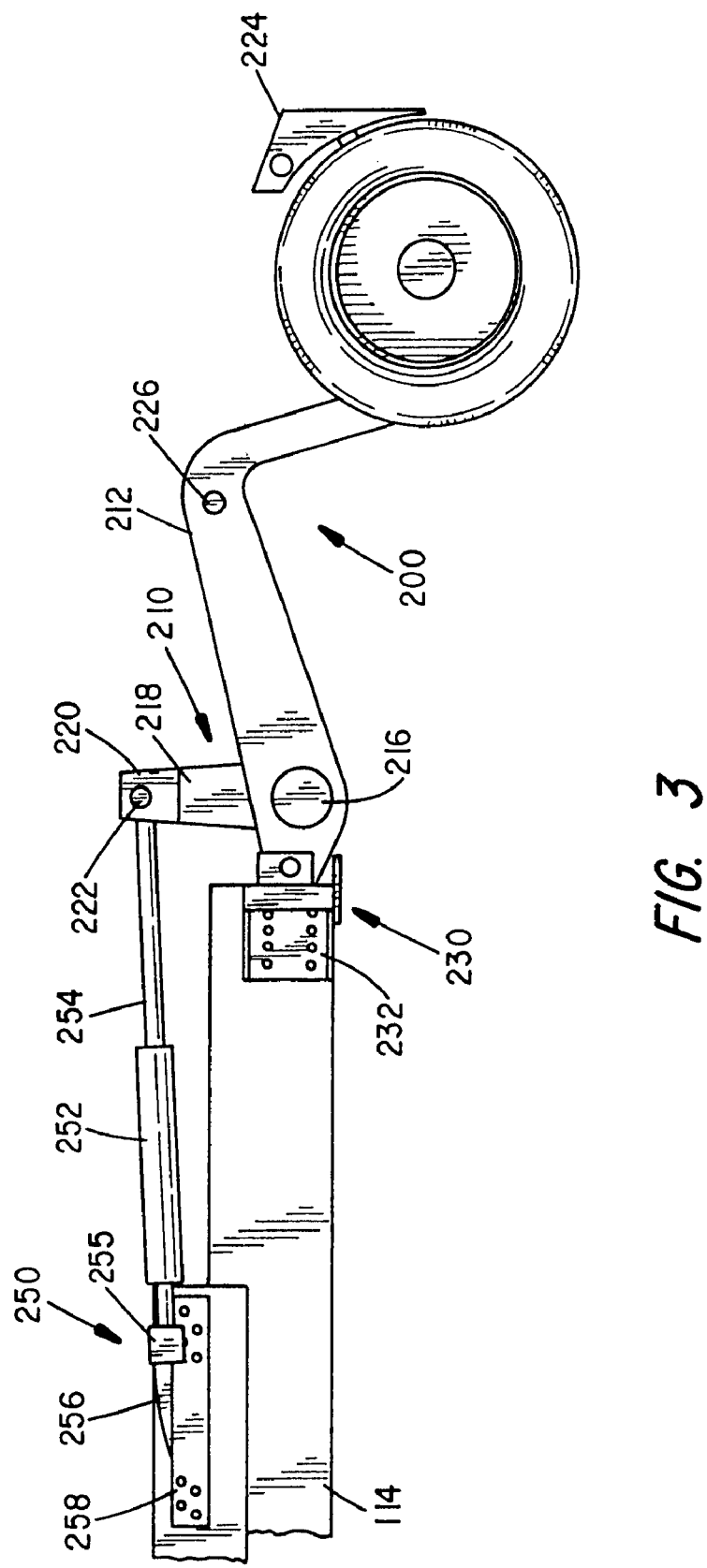
FIG. 3 depicts a side view of the auxiliary axle assembly depicted in FIG. 2.
Figure 4:
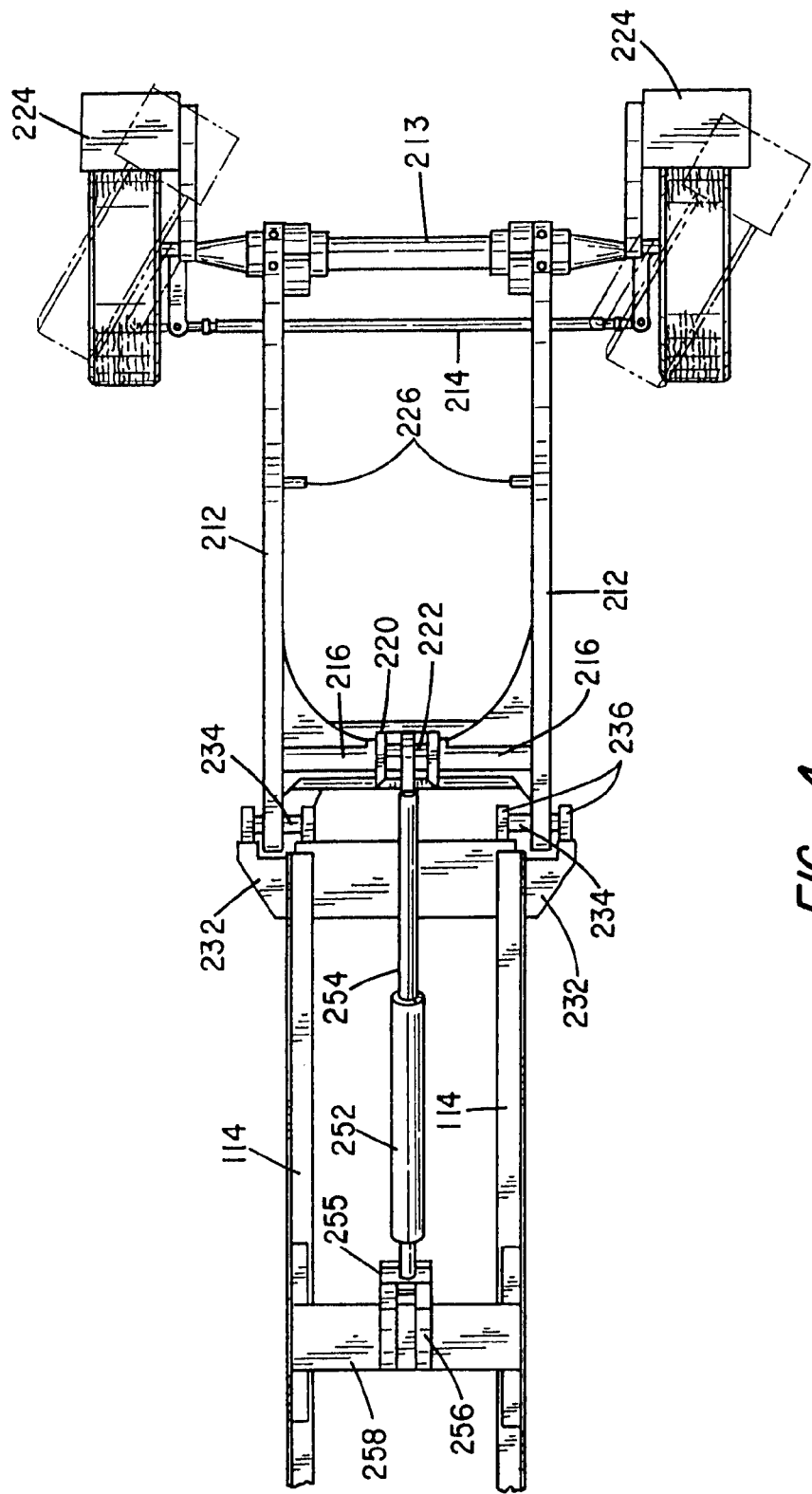
FIG. 4 is a top view of the auxiliary axle assembly of FIG. 3.

In FIGS. 3 and 4, the auxiliary axle assembly 200 includes an arm assembly, generally at 210, a rear assembly, generally at 230, and an actuator assembly, generally at 250. The arm assembly 210 includes a pair of spaced rearward extending arms 212 and between which an auxiliary axle 213 is mounted at the rear-most end of arms 212. A tie rod may be provided as at 214. The arms 212 which are substantially parallel and the front-most end of arms 212 is pivotally mounted to chassis members 114 by the rear assembly 230, as will be described. The arms 212 are joined by a common torque tube or cross member 216 and a lever arm shown at 218 is affixed to and extends upward from the tube 216 and supports a spaced pillow block mounting arrangement as at 220 are affixed thereto and secure a mounting pin or shaft as at 222. A fender is shown at 224.

The rear assembly 230 further includes a pair of pivot block brackets 232 affixed as by welding to chassis elements 114. A pair of pivot shafts or pins 234 are mounted in a pair of pivot blocks 236 and each arm 212 is pivotally mounted about pivot shaft 234. Actuator assembly or operating system 250 includes a double-acting hydraulic cylinder actuator 252 which includes a rod 254 mounted in pivoted relation to the blocks 220 as by shaft or pin 222. The blind end of cylinder 252 is also pivotally mounted as at 255 by a clevis arrangement including mounting blocks 256 mounted in a cylinder cross member 258.

It will be appreciated that collapse or retraction of the rod 254 will pivot the tag axle system 200 (arms 212) about the shafts 234 thereby raising the tag axle to the stowed position and, conversely, extension of the rod 254 in cylinder 252 will deploy the tag axle system as shown in FIG. 3.

It should be noted that the location of a retention or latch pin is indicated by 226. This pin is normally mounted on the inside of either of the arms 212 and is used in conjunction with the modular latch arrangement of the invention to retain the tag wheels in the raised or stowed position as desired.

Figure 5:
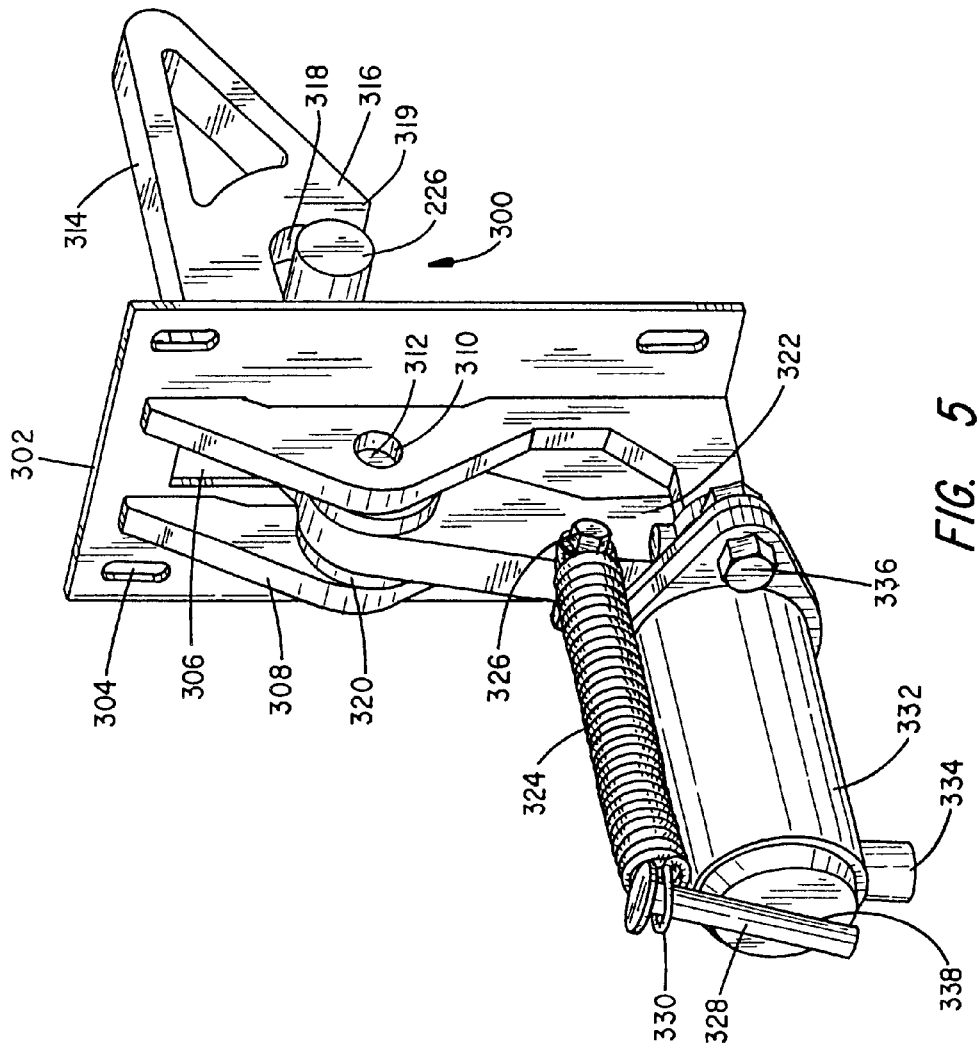
FIG. 5 is a perspective view of a modular tag axle latching system assembly constructed in accordance with the invention.

The latch mechanism itself is shown in the greatly enlarged perspective view of FIG. 5. The modular latch system, generally 300, includes a base or mounting plate 302 having a plurality of slotted mounting holes 304 and in an elongated central slot 306. A pair of spaced parallel shaped mounting flange members 308 are affixed to the base plate 302 and are provided with openings 310 which, in turn, carry a common mounting shaft or pin 312 on which a latch member 314 is mounted to pivot or rotate. The latch member 314 includes a hook arrangement 316 preferably having a particular internal curvature 318 adapted to releasably grab latch pin member 226 affixed to an arm 212 of a pivoting tag axle arrangement. Bushings are provided at the pivot joint of the latch at 320. The shaped latch hook member 314 further includes a tail section 322 and a tension spring 324 attached thereto as by a bolt member 326 which threadably engages the tail portion 322 of the latch member 314 at one end and is affixed to a pin or rod member 328 at the other as by an end loop 330. The tension spring 324 spans a linear operator, preferably a hydraulic cylinder 332 which is a single-acting cylinder having a blind end fluid inlet and outlet port at 334. The cylinder 332 is mounted as by bolts, one of which is shown at 336 to the shaped members 308 with the rod end of the cylinder addressing the tail portion 322 of the shaped latch member 314 in a manner such that when the cylinder is fully collapsed, the system will reside in the position shown in FIG. 5 with the latch hook in the latched or "down" position capturing the pin member 226 in the curved hook 318. Extension of the cylinder rod associated with the cylinder 332 pushes on the tail section 322 of the latch member 314 overcoming the tension of spring 324 thereby raising the hook assembly relative to the pin 226 to release the tag wheel assembly for deployment. The rod member 328 is affixed to the blind end of cylinder 332 as by welding at 338.

Figure 6:
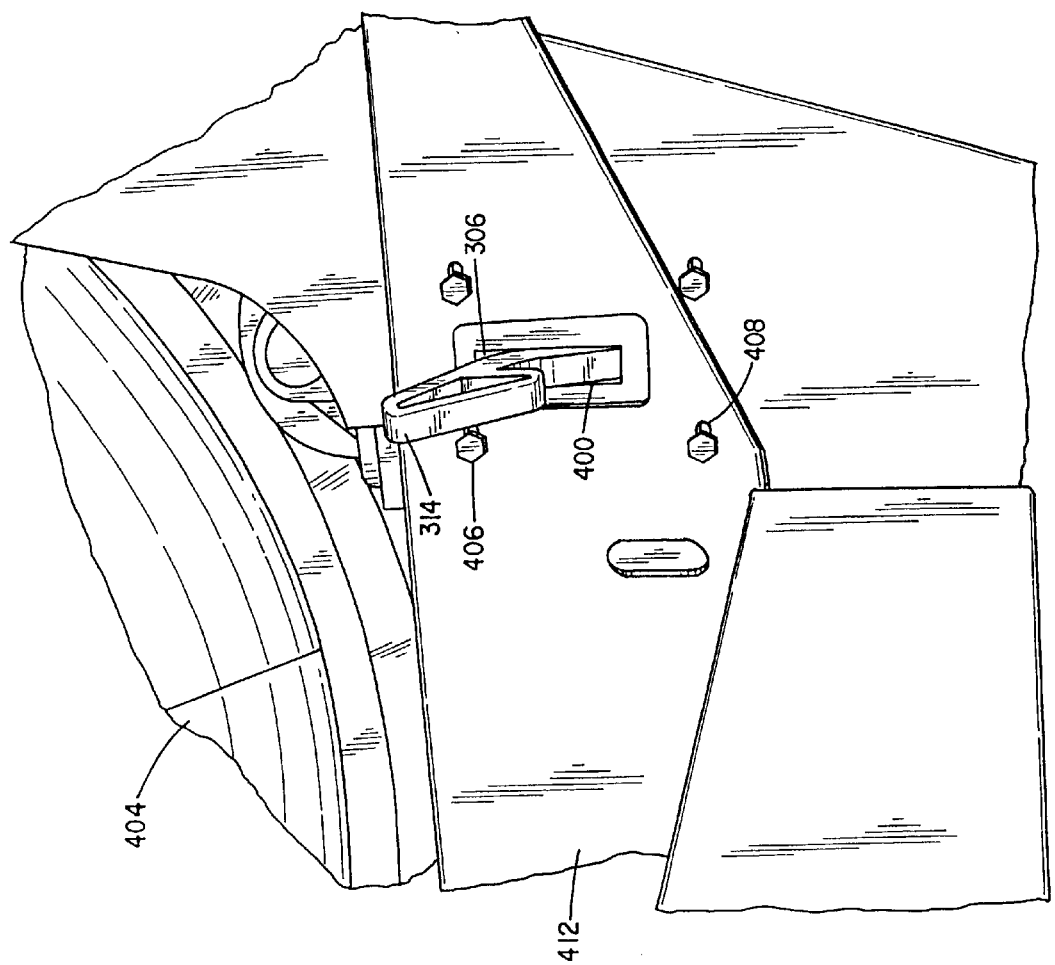
FIG. 6 is a fragmentary perspective view from the outside showing the modular latch of the invention installed through the plate metal of a transit mixer rear drum support structure.

Once assembled, the latch system presents a unitary structure which, as shown better in FIG. 6, can simply be bolted over an opening 400 in steel plate 402 utilized to support the rear end of the cement mixing drum 404 in a manner in which only the hook end of the latch 314 protrudes through the slot 306. The modular system mounts on four bolts as at 406 through generally horizontally slotted openings as at 408 in a manner which combines with the generally vertically slotted openings 304 in the plates 302 of the modular system to provide hook location adjustment in both vertical and horizontal directions so that adjustment of the exact location of the hook is quite simple. Note that replacement of the modular system also only involves the removal of the four bolts 406 and there is no need to replace individually located separate parts as in older systems. In addition, should hydraulic or pneumatic pressure be lost in the cylinder 332, the biasing spring 334 will assure that the latch hook member 314 remains in the "down" position and the pin 226 remains captured. The shape of the internal cavity of the hook 318 is such that while the pin 226 is captured by the end lip 319, movement of the pin into the hook or the hook away from the pin will allow engagement or disengagement as desired, being realized that the pin moves in a wider arc along with the pivoting of the tag axle system.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A modular vehicle-mounted safety latch assembly for retaining an auxiliary axle system of a work vehicle in an elevated, stowed position, said safety latch comprising:
    (a) a base plate for carrying said assembly mounted thereto and have a central slot opening;
    (b) a latch hook having a hook end and a tail end mounted from said base plate and adapted to pivot in relation thereto the hook end extending through said central slot;
    (c) a single-acting fluid cylinder having an extendable rod member having a free end, extendable in a power stroke, and a blind end mounted with fixed reference to said base plate and in relation to said latch hook such that when said rod is in a retracted/collapsed position, said latch hook rotates in a first direction to a latched position thereby capturing a latching member fixed to an auxiliary axle system;
    (d) a resilient biasing member connected between said latch hook and said fluid cylinder to maintain said tail end of said latch hook against said free end of said rod to bias said latch hook in a latched position when said rod retracts such that upon loss of fluid pressure in said cylinder, said latching member remains positively latched by said hook end, said latching member being released only on a power stroke; and
    (e) an adjustable mounting system for adjustably mounting said base plate on said vehicle structure such that only said protruding hook is exposed beyond the vehicle.

2. A modular vehicle-mounted safety latch assembly as in claim 1 wherein said assembly further comprises a pair of spaced parallel flange shapes fixed to said base plate and carrying said fluid cylinder and said latch hook, said latch hook being pivotally journaled on a pin carried between said flange shapes.

3. A modular vehicle-mounted safety latch assembly as in claim 1 wherein said resilient biasing member is a tension spring mounted between a tail portion of said hook and a member fixed to said fluid cylinder.

4. A modular vehicle-mounted safety latch assembly as in claim 1 wherein said fluid cylinder is a hydraulic cylinder.

5. A modular vehicle-mounted safety latch assembly as in claim 1 wherein said latching member is a retaining latch pin fixed to an auxiliary axle assembly pivotally mounted to said vehicle.

6. A modular vehicle-mounted safety latch assembly as in claim 5 wherein said auxiliary axle assembly to which said latch pin is fixed further comprises a pair of spaced arms pivotally mounted to the vehicle and including at least one tag axle and wheel and a cross member, said latch pin being carried on one of said arms and an operating system for moving the auxiliary axle assembly between a stowed position in which the wheels are elevated and a vehicle support position in which the wheels engage the ground.

* * * * *